United States Patent [19]

Carlson et al.

[11] Patent Number: 4,923,057
[45] Date of Patent: May 8, 1990

[54] ELECTRORHEOLOGICAL FLUID COMPOSITE STRUCTURES

[75] Inventors: J. David Carlson, Cary; John P. Coulter, Durham; Theodore G. Duclos, Raleigh, all of N.C.

[73] Assignee: Lord Corporation, Erie, Pa.

[21] Appl. No.: 246,847

[22] Filed: Sep. 20, 1988

[51] Int. Cl.$^5$ .............................................. F16F 7/10
[52] U.S. Cl. .................................. 188/378; 188/267; 188/268; 267/136; 294/86.4
[58] Field of Search ............... 188/378, 379, 380, 267, 188/268, 322.5; 267/140.1, 113, 136; 244/119; 248/550; 280/707; 180/312; 294/86.4

[56] References Cited

U.S. PATENT DOCUMENTS

| | | | |
|---|---|---|---|
| 2,361,071 | 10/1944 | Vang | 188/1 |
| 3,058,015 | 10/1962 | Nesh | 310/8.7 |
| 4,470,121 | 9/1984 | Ebert | 364/508 |
| 4,565,940 | 1/1986 | Hubbard, Jr. | 310/326 |
| 4,664,100 | 5/1987 | Rudloff | 128/79 |
| 4,733,758 | 3/1988 | Duclos et al. | 188/267 |
| 4,742,998 | 5/1988 | Schubert | 188/322.5 X |
| 4,773,632 | 9/1988 | Härtel | 188/267 X |

FOREIGN PATENT DOCUMENTS 3336965 5/1985 Fed. Rep. of Germany .
1259802 1/1972 United Kingdom .

OTHER PUBLICATIONS

Whitney et al., "Experimental Mechanics of Fiber Reinforced Composite Materials", 1984, pp. 26–31.
Nashif et al., "Vibration Damping", 1985, Chapters 6 & 7.
DiTaranto, "Theory of Vibratory Bending for Elastic and Viscoelastic Layered Finite-Length Beams", 1965, pp. 881–886.
Ross et al., "Damping of Plate Flexural Vibrations by Means of Viscoelastic Laminae", 1959, Section 3, pp. 49–87.
Plunkett, "Measurement of Damping", 1959, Section 5, pp. 117–131.
Anaskin et al., "Effect of External Electric Field on Amplitude-Frequency Characteristics of Electrorheological Damper", 1984, pp. 233–238.
Korobko et al., "Influence of an External Electric Field on the Propagation of Ultrasound in Electrorheological Suspensions", 1985, pp. 153–157.
Ver et al., "Interaction of Sound Waves with Solid Structures", 1971, Chapter 11.
Beranek, "The Transmission and Radiation of Acoustic Waves by Solid Structures", 1958, Chapter 13.
Gandhi et al., "Electrorheological Fluid Based Articulating Robotic Systems", 1987, pp. 1–10.
Brooks et al., "Viscoelastic Studies on an Electrorheological Fluid", 1986, pp. 293–313.

Primary Examiner—Douglas C. Butler
Attorney, Agent, or Firm—David L. McCombs

[57] ABSTRACT

Controllable electrorheological fluid composite structure elements incorporate electrorheological fluids as a structural component between opposing fluid containment layers to form at least a portion of any variety of extended mechanical systems such as plates, panels, beams and bars or structures including these elements. The electrorheological fluid is operatively contained in a region between the containment layers and has complex shear and tensile modulus properties which vary with the electric field applied thereto. A variable power source is utilized to create an electric potential between the layers of the structure element to create the electric field. An alternative power source may include the use of a piezoelectric material layer. In order to maintain the insulation and spacing between the containment layers, a fabric or separating layer having an open mesh is provided which permits the transportation of electrorheological fluid in the region between the layers. Multiple layers and regions are contemplated including orientation orthogonally to the long axis of the structure to take advantage of the elongational modulus of the fluid. The composite structures of the present invention may be incorporated in a wide variety of mechanical systems for control of vibration and other properties.

18 Claims, 10 Drawing Sheets

ELECTRORHEOLOGICAL FLUID COMPOSITE STRUCTURES

BACKGROUND OF THE INVENTION

The present invention relates generally to the control of flexible, undamped or lightly damped structures, and more particularly, the present invention relates to the use of electrorheological fluids as a structural component to obtain controllable structural behavior in extended mechanical systems such as plates, panels, beams and bars or structures including such elements.

Generally, the stiffness and damping characteristics of a mechanical structure are fixed parameters which cannot be easily changes or controlled once fabrication is complete. This is particularly the case with extended mechanical structures in which the damping and stiffness parameters are distributed throughout the structural materials in contrast to lumped parameter systems in which the damping and stiffness are concentrated in a limited number of discrete elements. Distributed control of stiffness and damping are desirable and often required in dynamic mechanical systems in which system motion may result in bending or flexing of the structural elements. Controllable structural behavior of the present type is particularly desirable in numerous engineering applications, which include but are not limited to the control of vibrations in aerospace and automotive applications, sound propagation through panels and walls, flexible fixturing in advanced manufacturing systems, and improvement of robot manipulator response time.

The interaction of dynamic forces with mechanical structures generally results in the generation and propagation of bending (flexure) waves in the structure. Bending waves travel easily along a structure and around corners. If the induced bending waves are sufficiently intense, the material of the structure may fail, or electronic or mechanical equipment attached to it may malfunction. Bending waves of less intensity may be strong enough to radiate disturbing sound or to cause unacceptable vibration. Bending waves are easily excited in plates, panels, beams and bars by air-borne or water-borne sound waves. In turn, bending waves readily radiate sound energy into fluid media.

In aerospace applications, for example, a fuselage or other structure can be set into vibration (1) by sound waves produced by the engines or propellers, (2) by direct excitation from the vibration of the engines, or (3) by traveling turbulence vortices moving over the exterior surfaces due to motion of the craft through the air. Such structure-borne bending waves in the fuselage radiate air-borne sound into the cabin and cause vibrations of equipment.

To alleviate these and other undesired phenomena in aircraft and other structures, methods for controlling or reducing the amplitude of the bending waves must be found. The variable control of structural behavior which is desired is to be distinguished from traditional damping means, which typically operate as discrete couplings between the elements to be isolated and the source of mechanical disturbance. While a large variety of existing damper elements can successfully control the motion of coupled members in many cases, discrete dampers are inherently inadequate to control the overall constitutive characteristics of structures in the manner contemplated herein. Spatially discrete damping treatments are number of vibrational modes. It would therefore be desirable to achieve a system that allows for control of spatially distributed parameters which can in theory control an infinite number of vibrational modes.

In certain types of fluid mount and damper applications, electrorheological fluids have provided remarkable results in system control. Electrorheological (ER) fluids are materials which change their mechanical properties in the presence of an electric field. For example, see U.S. Pat. Nos. 3,047,507; 4,129,513, and 4,772,407. In general, ER fluids consist of a suspension of very fine particles in a dielectric liquid media. Such fluids were first referred to as "electroviscous" because of their apparent viscosity changes in the presence of an electric field. A better understanding of these types of compositions has revealed that the phenomenon being observed is a change in the minimum stress required to induce flow in the fluid, while the actual viscosity remains generally constant. Accordingly, these effects are better described in terms of the total rheology of the composition, and as such are now more commonly referred to as "electrorheological" fluids. In the absence of an electric field, ER fluids exhibit Newtonian flow characteristics; their strain rate is directly proportional to applied stress. However, when a sufficient electric field is applied, a yield stress phenomenon occurs such that no flow takes place until the stress exceeds a yield value which rises with increasing electric field strength. Because electrorheological fluids change their characteristics very rapidly when electric fields are applied or removed, they possess great potential for providing rapid response interface in controlled mechanical devices. Typically, ER fluids have been utilized in mechanical systems such as electromechanical clutches, fluid filled engine mounts, high speed valves and active dampers.

British Pat. No. 1,259,802, for example, teaches the use of an electroviscous or magnetoviscous fluid within a damper or mount. The fluid is provided between opposing walls of a cavity in the mount member. The mount member is coupled between load elements to control the motion condition therebetween. Other representative damper members or mounts include U.S. Pat. Nos. 3,207,269; 4,720,087 and 4,733,758.

Control of the overall dynamic properties of structures is not easily or efficiently accomplished by localized damping, and in many cases cannot be accomplished to the extent desired by localized damping. Even for a simple plate-like structure of finite size there are an infinite number of frequencies at which resonance can occur. For each resonance there is a different arrangement of nodal lines and points of maximum vibration over the surface of the plate. Attempts to control structure-borne vibration in applications such as aircraft include that disclosed in U.S. Pat. No. 2,361,071. Electronic actuator devices are placed at locations within the structure which produce amplified, tuned vibrations which responsively cancel the input motion vibration. These rather crude, localized devices are not entirely adequate in producing counteractive vibratory frequencies. Additionally, like damper assemblies which utilize hydraulic fluid or which are actively controlled in some manner they are not particularly useful to control stiffness or other structural characteristics.

Damping control of structures often includes the application of a viscoelastic material to the surface of the vibrating structure. In structures where high stiffness and tensile strength with low weight is a primary factor, such as in aircraft, light weight damping materials are needed to control the excitation and transmission of bending waves in the structure. Efficient, light weight damping can often be achieved by placing a thin constraining layer over the viscoelastic material. The effect of such a layer is to enhance the amount of shear deformation experienced by the damping layer such that more energy is dissipated per cycle of vibration and damping of the vibration occurs more rapidly than would be the case without the constraining layer. This constrained layer damping treatment material can be manufactured in tape form, and is easily applied to aircraft fuselages, architectural structures and the like as a noise or vibration control measure.

A problem with constrained layer damping treatments is that they are optimized for only a single given temperature and operating frequency. The requirements for optimum damping with constrained layers are quite different than for those of a single layer where, in general, more material damping is better. In the case of a constrained layer the overall composite structure damping is a complicated function that involves both the stiffness and damping of the viscoelastic layer. Too much damping in the constrained viscoelastic layer can actually result in decreased system damping in certain frequency ranges. Variable control of the stiffness and/or damping of the constrained layer would be desirable to achieve optimum system performance over a broad frequency range.

One approach to the optimal control of constrained layer damping is that described in U.S. Pat. No. 4,565,940 where the constraining layer is a piezoelectric film. The damping effect of the constrained layer can be controlled by varying the voltage applied to the film to provide controllable damping that is somewhat effective. However, active control of vibrations using piezoelectric films, even in combination with viscoelastic materials, include various shortcomings. For example, high output piezoelectric ceramic materials are inapplicable because of their weight, their brittleness and the fact that large, thin sections are difficult to fabricate. Piezoelectric polymers, on the other hand, while light weight, flexible and available in large, thin sheets are incapable of producing forces which are sufficiently large to have a significant effect in most practical systems.

While the control of vibration and other properties of mechanical systems has been approached in a variety of ways, arrangements heretofore developed have failed to provide overall, adaptable control of structure behavior in a cost effective manner for diverse commercial application. Discrete, lumped parameter dampers which are actively controlled by electrorheological, magnetoviscous or other means for coupling between portions of mechanical systems are not well suited to global tailoring of dynamic characteristics of extended structures. On the other hand, distributed treatments such as traditional viscoelastic material layers with fixed non-controllable stiffness and damping characteristics are not well suited for global application because they are incapable of responding in an optimal fashion to changing system requirements or dealing effectively with resonant conditions. Piezoelectric augmented constrained layer treatments, while capable of improved control in certain instances where overall damping requirements are minimal, cannot provide effective control in most practical systems. The need is apparent for instantaneously controllable materials in mechanical systems which may be dynamically tailored in a distributed fashion to achieve desired performance behavior. Preferably, the structural properties to be variably controlled throughout the extent of the structure include the effective loss factor and the complex flexural rigidity of the material. Also, the materials employed should be resilient when stress and strain limits are exceeded.

It is accordingly an object of the present invention to provide flexible mechanical structures having instantaneously variable and reversible structural characteristics which eliminate or substantially minimize the above mentioned and other problems typically associated with stiffness and damping control of structures of conventional construction and operation.

SUMMARY OF THE INVENTION

More specifically, the present invention provides for constitutive control of the mechanical characteristics of flexible structures which incorporate as at least a portion thereof electrorheological fluids operatively enclosed between containment layers. The real and imaginary components of the shear or tensile modulus of the electrorheological fluid can be varied as a function of the electric field applied, thereby permitting instantaneous and continuously variable modification of the complex stiffness of structures in extended mechanical systems such as plates, panels, beams and bars or structures which include these elements. The vibration characteristics of flexible extended structures such as those which integrate or are formed of electrorheological fluid composite elements of the present invention are determined by the distribution of mass, stiffness and damping of the structure, all of which may be selected and varied as control parameters.

The electrorheological fluid composite structure elements are comprised of containment layers which provide for structural integrity and likewise serve as conductive electrodes. The containment layers are generally parallel and create a void or region therebetween for housing the electrorheological fluid. Because an electric potential is developed between the opposing ones of the containment layers for providing the electric field across the electrorheological fluid, appropriate insulating means is provided to prevent electrical arcing and failure of the system. Variation in the voltage potential applied to the layers provides the requisite control for selecting the desired properties of the electrorheological fluid and mechanical behavior of the attendant structure. The layers may be placed in overlying relationship to provide controllable laminae or configured in multiple contiguous relationships to provide for regional or patterned behavior control of a structure.

Electrorheological fluid composite structure elements of the foregoing type may also incorporate a fabric or separating member in the region between the electrodes or containment layers. Particularly where the containment layers are thin or subject to harsh mechanical impulses, the separating member serves to maintain the containment layers in proper parallel relationship and prevent electrical arcing. The separating member or fabric layer may be composed of any suitable open mesh insulator which will permit appropriate transportation and communication of electrorheological fluid within the region between the layers.

In order to more fully take advantage of the tensile of elongational properties of the particular electrorheological fluid, the composite structure element may be configured with the containment layers positioned in a series type of arrangement in a direction orthogonal to the overall length thereof. The multiple regions in consecutive position may be powered by a single or multiple voltage potential and selectively varied to determine the rigidity and other material characteristics. In such a configuration, the structural property that would exhibit the widest range of controllable variation would be elongational modulus of the electrorheological fluid in the direction normal to the planes of the electrodes or containment layers.

An alternative power source for generating the electric field across the electrorheological fluid may be provided by a piezoelectric polymer layer incorporated as a portion of the structure. Mechanical energy imparted to the structure is translated by the piezoelectric material into electrical energy for varying the complex moduli of the fluid.

Importantly, the material behavioral characteristics of electrorheological fluids, laminae incorporating such variable viscoelastic materials, and composite structures in general are controllable according to the present invention to design and construct a variety of structures having a wide range of commercial applicability. In designing these structures, the relationship between the overall bending stiffness and damping loss factor of composite panels and the complex shear and tensile properties of electrorheological fluids contained in such composite structures can be understood from mathematical theory normally applied to structural damping using viscoelastic materials which has been expanded herein to controllable viscoelastic layers incorporating electrorheological fluids. In this manner, mathematical expressions have been derived for the loss factor and bending stiffness of the structures having as variables the complex electrorheological fluid properties. Tests were performed on composite beam specimens for verification of these theories and the principles of the present invention.

BRIEF DESCRIPTION OF THE DRAWINGS

For a better understanding of the invention, reference may be made to the following description of exemplary embodiments, taken in conjunction with the figures of the accompanying drawings, in which.

DESCRIPTION OF THE PREFERRED EMBODIMENTS

Perspectively illustrated in FIGS. 1-4 are composite structure elements 10a-10d which embody principles of the present invention and are suitable for use as a structural component in a variety of flexible, extended mechanical systems. While elements 10a-10d are configured for purposes of illustration as a plate member or beam, they may be utilized as structural components in numerous extended mechanical systems which would include plates, panels, beams and bars as well as structures which include such elements. Composite structure elements 10a-10d include containment layers 12 which generally define the structure, electrorheological fluid 14 enclosed or encased between layers 12 and a power source 16.

Figure 1:
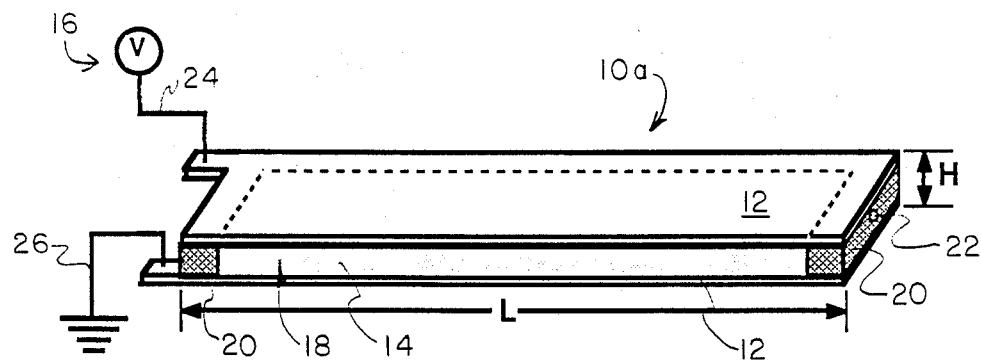
FIG. 1 is a partial cross-sectional view in perspective of an electrorheological fluid structure element of the present invention.

Referring more specifically to FIGS. 1-4, containment layers 12 provide structural integrity to elements 10a-10d and likewise serve as conductive electrodes for providing an electric field across the electrorheological fluid 14. Layers 12 are generally flexible and may be made of any suitable engineering material, such as metal, plastic, composite or other materials to meet specific design requirements. Layers 12 are insulated one from the other to permit a voltage potential therebetween. They are maintained in a spaced relationship across region 18 which contains the electrorheological fluid 14. In the case of element 10d and as will be discussed subsequently, multiple layers 12 and multiple regions 18 may be contemplated. For providing proper containment of ER fluid 14 and adjusting the distance between layers 12 across region 18, a nonconductive layer or spacing members 20 are placed between layers 12, typically about the peripheral edges thereof. Nonconductive spacing members 20 also may serve as a sealant or adhesive to properly bond layers 12 one to the other. It is also apparent that the nonconductive members 20 may be patterned to segment separate areas or multiple regions 18 containing isolated pockets of fluid 14. As shown in FIG. 1, a filling port 22 permits addition and removal of fluid 14 to region 18. Power source 16 creates a necessary electric potential between the opposing containment layers 12 by attachment of high voltage and ground leads 24 and 26 respectively thereto. Changes in the voltage applied by power source 16 vary the electric potential between the conductive containment layers 12 and hence the electric field across the electrorheological fluid 14. In this manner, the mechanical behavior of elements 10a-10d may be variably controlled by changes in the complex moduli of the electrorheological fluid 14. The dynamic properties, spacing, number and thicknesses of containment layers 12 as well as the one or more regions 18 therebetween are determined by the particular application and the controllable range of the electrorheological fluid 14.

Figure 2:
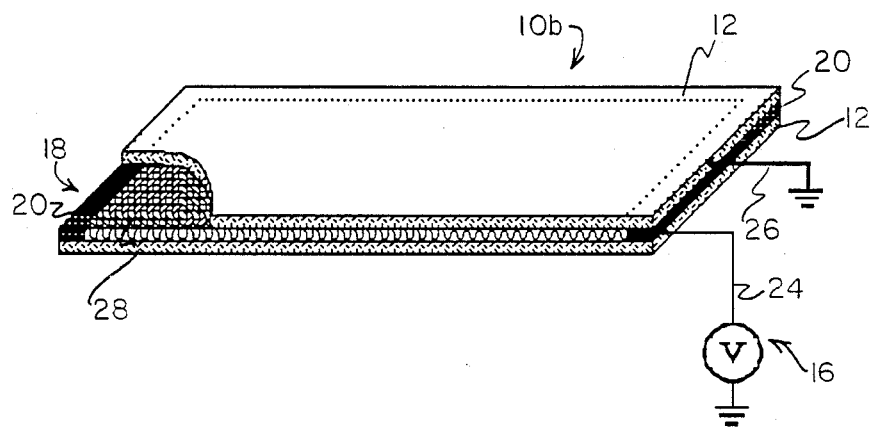
FIG. 2 is a somewhat enlarged, partially broken away, partial cross-sectional view in perspective of an electrorheological fluid composite structure element of the present invention showing a fabric spacing member in the region between the conductive containment layers of the element.
Figure 19:
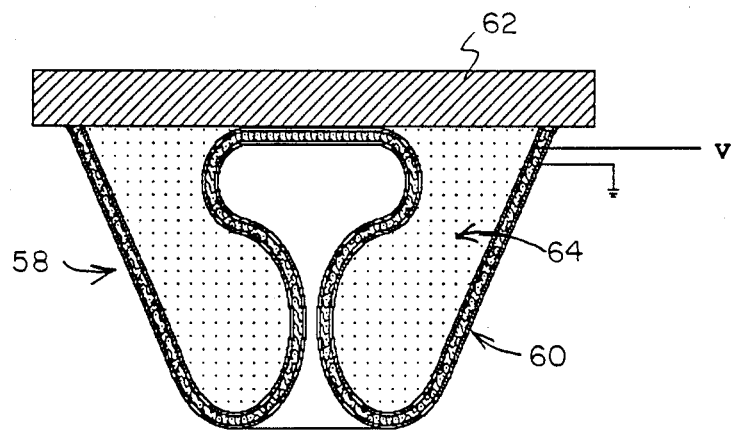
FIG. 19 is a schematic representation in partial cross-section showing a gripping apparatus formed in part with an electrorheological fluid structure element similar to that shown in FIG. 2.

Referring now to FIG. 2, there is depicted composite structure element 10b embodying principles of the present invention and showing the inclusion of an open mesh insulating fabric member 28 within region 18. Fabric member 28 serves the function of providing insulated and consistent parallel spacing between containment layers 12. The inclusion of fabric member 28 is particularly expedient for applications in which containment layers 12 are especially flexible, such that pressure thereon might result in immediate electrical arcing between the layers. For example, element 10b may generally be configured as a very flexible, fabric-like material similar to a cloth or bag in certain applications, such as that which will be discussed subsequently relative to FIG. 19. In such cases, the integrity of spacing between layers 12 would be difficult to maintain under normal conditions of contact or mechanical input. Fabric member 28 provides the desired insulating feature yet permits adequate communication and transportation of electrorheological fluid 14 within region 18. The ability of fluid 14 to migrate within region 18 may easily be controlled by fabric member 28 depending upon the selected configuration of the tortuous path through the open mesh. Fabric member 28 may be constructed of any suitably rigid and porous plastic, fiber, or other material.

Figure 3:
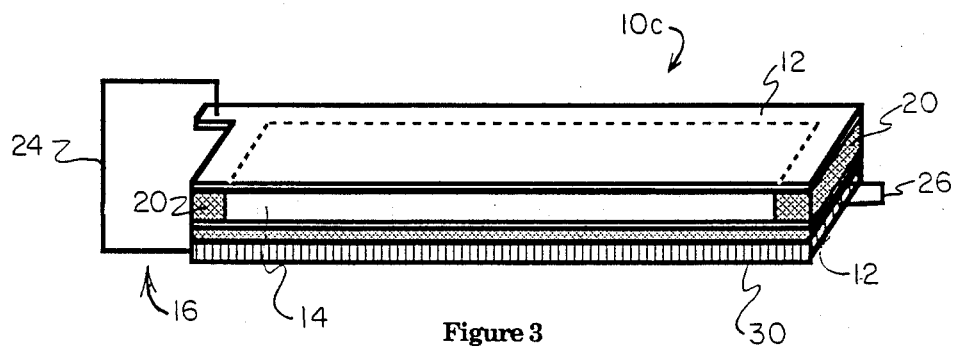
FIG. 3 is a somewhat enlarged, partially broken away, partial cross-sectional view of an alternative electrorheological fluid structure element of the present invention showing a piezoelectric polymer layer as the electric field generating means.

It is also possible to provide a self-contained power source as an integral portion of composite structure element 10c, as shown in FIG. 3. In certain applications, for example, it may not be practical to provide an external power source to the particular working system. Element 10c contemplate the incorporation of a piezoelectric material as a separate layer and internal power source 16. Mechanical input or kinetic energy impacting or deforming element 10c is transformed into electric energy by piezoelectric material layer 30. The electric energy created in this manner is sufficient to provide an electric potential between containment layers 12 and hence electric field across electrorheological fluid 14. In this manner, composite structure element 10c is self-controlled, since the impact or amount of deformation experienced will determine the electric potential created and, hence, the degree of change in the complex moduli of electrorheological fluid 14.

Figure 4:
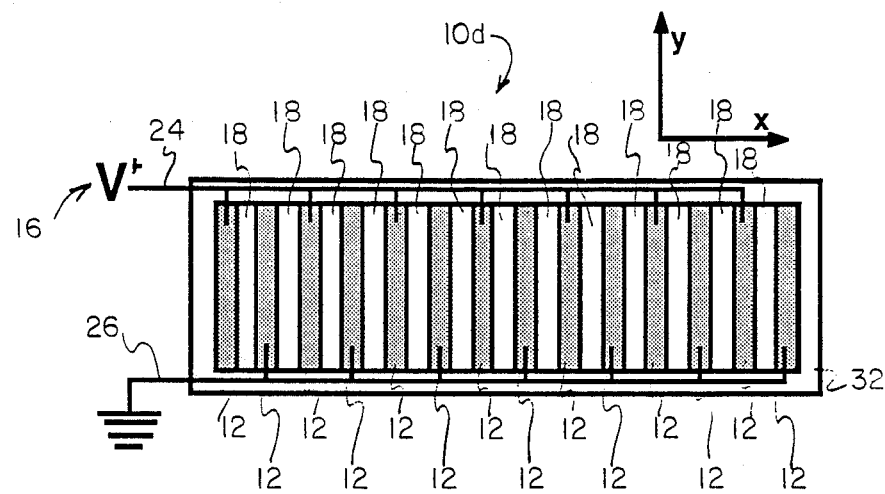
FIG. 4 is a plan view of an alternative electrorheological fluid structure element of the present invention having a series of conductive containment layers oriented perpendicular to the depicted x-axis.
Figure 5:
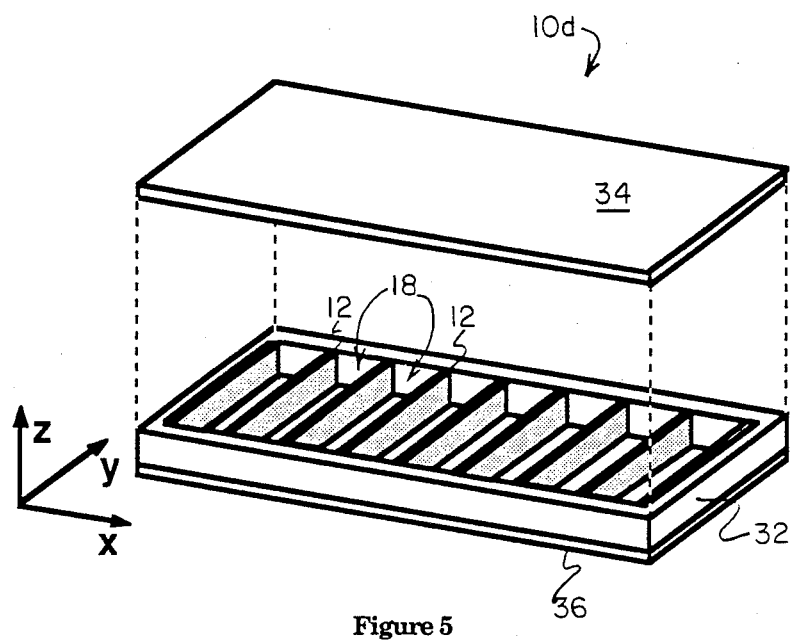
FIG. 5 is a partially exploded, perspective view of the electrorheological fluid structure element shown previously in FIG. 4.

The modulation of the shear and tensile properties of electrorheological fluid 14, as will be discussed subsequently in detail, determine the complex stiffness of the particular composite structure configuration. In order to more fully take advantage of the tensile or elongational properties of the particular fluid 14, composite structure element 10d is contemplated as shown in FIGS. 4-5. Containment layers 12 are positioned in a series type of arrangement as shown, such that multiple regions 18 therebetween for containment of ER fluid 14 are consecutively positioned in the x-direction. A single or multiple power sources 16 may be provided to create the selected electric potential between opposing ones of layers 12 and electric fields across ER fluid 14 in each region 18. A nonconductive encasement 32 may be used to support the containment layers 12 in combination with or in lieu of insulating layers 20. The encasement 32 is suitable to enclose ER fluid 14, and is constructed of nonconductive, insulating material of appropriate rigidity and other material characteristics. The positioning of containment layers 12 with ER fluid 14 therebetween in the arrangement as shown produces the overall result of variable effective lamina properties. In this configuration, the structural property that would exhibit the widest range of controllable variation would be the elongational modulus in the direction normal to the planes of the electrodes, which in FIGS. 4 and 5 correspond to the x-direction.

Implicit in the description of extended mechanical systems such as plates, panels, beams and bars of the present invention represented generally by composite structure elements 10a-10d and possible applications subsequently discussed is the idea that these structures are in some sense "thin". Generally speaking, these structures are thin in one direction and large or extended in one or both of the orthogonal directions. Much of the mathematics developed and subsequently discussed herein to describe the dynamics of these structures is best applied to geometries which have these characteristics. For example, the following equation describes the critical coincidence frequency, $f_c$ in terms of bending stiffness and mass density:

$$f_c = \frac{c^2}{2\pi}\sqrt{\frac{\rho_s}{B}} \quad (1)$$

where c is the speed of sound in the medium surrounding the panel, $\rho_s$ is the mass per unit area of the panel and B is the bending stiffness of the panel. This equation is only valid if the wavelength of the bending wave $\lambda_b$ is greater than about 6 times the thickness H of the panel. This can be looked at as a high frequency limit or a limit on panel thickness. Thus, one criteria for quantification of structural dimension may be that the wavelength of the bending wave $\lambda_b$ is greater than 6 times the thickness H of the panel:

$$\lambda_b > 6H \quad (2)$$

Another criteria of quantification stems from the relationship between overall structure or panel length L, the longest dimension, and the bending wavelength $\lambda_b$. The lowest frequency mode of vibration will have $\lambda_1 = 2L$. This can be viewed as a low frequency limit or a limit on minimum lateral extent. In this manner, the criteria for quantifying the geometry of the structure may be:

$$2L > \lambda_b \quad (3)$$

In combining the above criteria a limiting relationship between structural or panel thickness and lateral extent which may be used as a general guideline is that the length is typically greater than three times the thickness:

$$L > 3H \quad (4)$$

An important aspect of the present invention is the universal scope of the vibration characteristics of flexible structures such as elements 10a-10d which can be controlled by modulation of the electric field applied to ER fluid 14. The exact means by which this is accomplished in the present invention involves using ER fluids in a manner that is different than in conventional applications.

Figure 6:
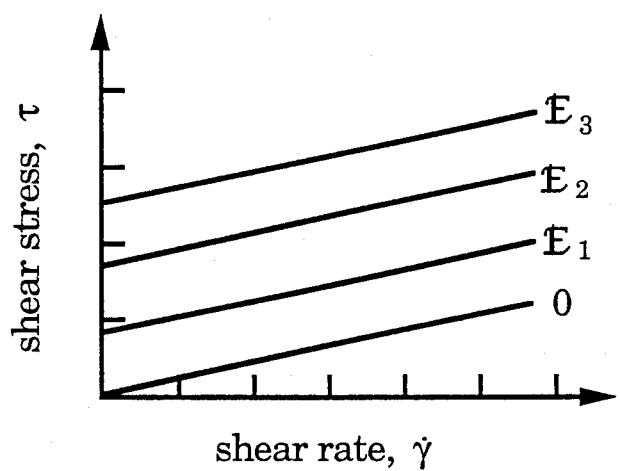
FIG. 6 is a graphical representation illustrating typical flow behavior of an electrorheological fluid showing shear stress, $\tau$, as a function of shear rate, $\dot{\gamma}$ for several increasing values of electric field strength $\xi$.
Figure 7:
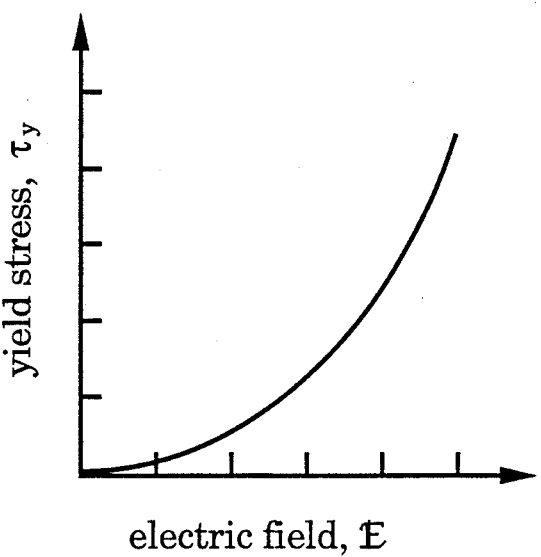
FIG. 7 is a graphical representation of the relationship between yield stress, $\tau y$ and electric field, E for a typical electrorheological fluid.

ER fluids behave like Bingham solids with a yield stress that is determined by the magnitude of the applied electric field. When an electric field is applied to an ER fluid, no flow takes place until the stress exceeds a yield value which rises with increasing electric field strength. In the absence of an electric field, ER fluids are approximately Newtonian in their behavior with stress proportional to strain rate. Typical flow behavior of an ER fluid such as ER fluid 14 of the present invention is illustrated in FIG. 6 which shows shear stress, $\tau$, as a function of shear rate $\gamma$ for several increasing values of electric field strength $\xi$ including the zero-field case. The intercept of the curves with the shear stress axis is defined as the yield strength $\tau_y$. The slope of these curves is defined as the viscosity and is approximately independent of electric field. The effective viscosity of the ER fluid is defined as the ratio of shear stress to shear rate and is seen to increase markedly with increasing electric field, particularly at low shear rates. FIG. 7 shows the increase in yield strength $\tau_y$ with electric field $\xi$ for a typical ER fluid 14.

Figure 8:
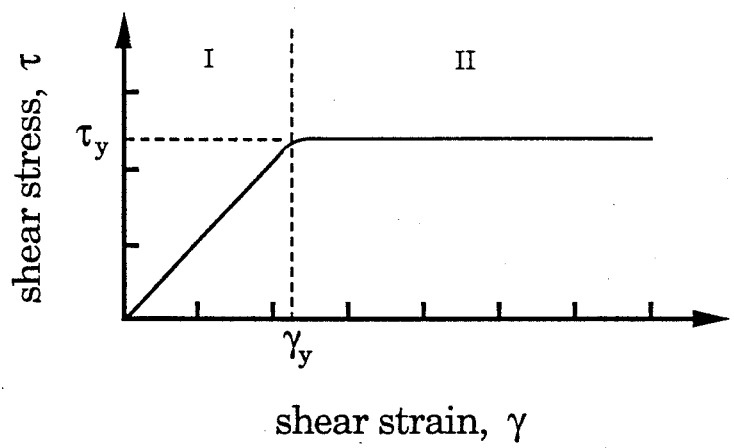
FIG. 8 is a graphical representation of the relationship between shear stress, $\tau$ and shear strain, $\dot{\gamma}$ for a typical electrorheological fluid, such that in region I the yield stress increases smoothly with increasing strain, and in region II the electrorheological fluid has yielded and flows such that shear stress no longer increases proportionally with stain.

The ER fluid behavior which is of most importance in the present invention is the behavior of the fluid before yield, i.e. before it flows and it acts like a solid rather than a liquid. This difference is illustrated in FIG. 8 which shows shear stress $\tau$ versus shear strain $\hat{\gamma}$ for an ER fluid. Two distinct regions of behavior occur. Region I is below yield. In this region the yield stress increases smoothly with increasing strain until the yield strength $\tau_y$ is reached at the yield strain $\gamma_y$. In region II the fluid has yielded and now flows such that shear stress no longer increases proportionately with strain. The typical ER fluid behavior shown in FIG. 6 takes place in region II where the fluid is flowing.

Figure 9:
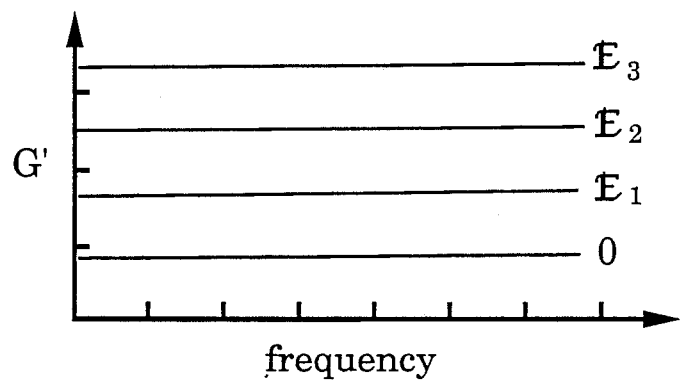
FIG. 9 is a graphical representation of the relationship between the real component of the shear modulus G' and frequency for an electrorheological fluid.
Figure 10:
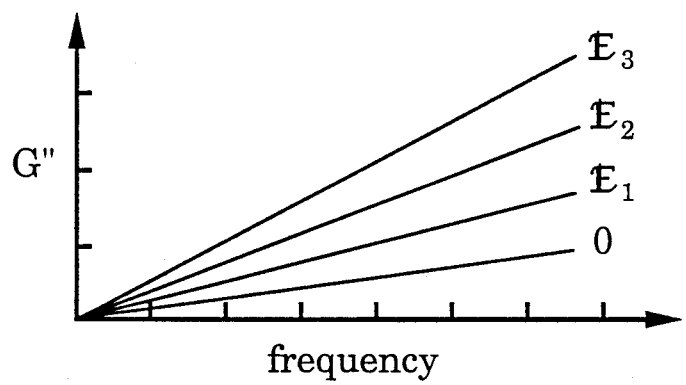
FIG. 10 is a graphical representation of the relationship between the imaginary component of the shear modulus G" and Frequency for an electrorheological fluid.

The ER fluid behavior which is most useful in the present invention is an increase in shear and tensile modulus with increasing electric field strength which occurs in region I for stresses and strains which are less than the yield values. In this region ER fluids behave like viscoelastic solids which exhibit both elastic and viscous characteristics. The shear characteristics in this region are best described by the complex shear modulus $G = G' + iG''$. The real part of the shear modulus $G'$ has been found to increase with increasing electric field strength and is relatively constant over a broad frequency range as shown in FIG. 9. The imaginary part of the shear modulus, $G''$, increases both with increasing electric field and increasing frequency as shown in FIG. 10. In a like manner the real and imaginary parts of the tensile modulus $E'$ and $E''$ can be changed with an electric field.

According to the present invention it is the electric field dependence of $G'$, $G''$, $E'$ and $E''$ in ER fluid 14 that is used to control the overall complex stiffness of composite structures such as elements 10a-10d. By controlling the moduli components $G'$, $G''$, $E'$ and $E''$ of ER fluid 14 contained in a composite structure such as a panel or beam, the overall bending stiffness B and damping $\eta$ of that structure can be controlled.

Figure 11:
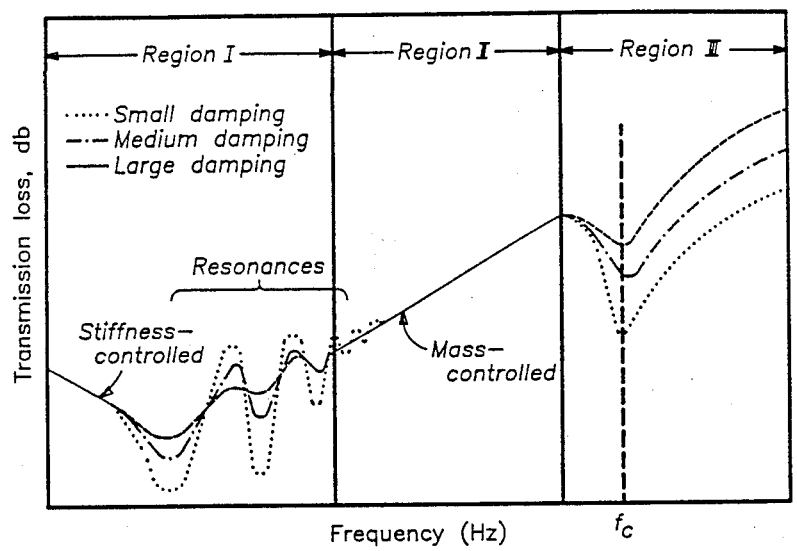
FIG. 11 is a graphical representation of the vibration characteristics of flexible extended structures showing the acoustic transmission of loss for a panel rigidly supported at its boundaries, having a low frequency region I which is stiffness controlled, a mid-frequency region II which is mass controlled, and high-frequency region III that is dominated by acoustic wave coincidence.

The vibration characteristics of flexible extended structures such as those which integrate or are formed from any one of elements 10a-10d are determined by the distribution of mass, stiffness and damping thereof. An example of this is shown in FIG. 11 which shows the acoustic transmission of loss for a panel that is rigidly supported at its boundaries. The behavior of this panel can be separated into three regions: (I) a low frequency region that is stiffness controlled and contains the dominant panel resonances; (II) a mid-frequency region in which the panel motion is largely mass controlled; and (III) a high frequency region that is dominated by acoustic wave coincidence, i.e. the frequency region where the wavelength of bending waves in the panel equals the wavelength of the sound in the surrounding medium. For frequencies less than the lowest resonance, the bending stiffness B controls the movement of the panel while mass and damping are relatively unimportant.

Above the first few resonances the mass density per unit area ρs generally becomes the most important parameter until the critical coincidence frequency $f_c$ is reached at which point stiffness and damping again become important.

The resonant frequencies of the panel whose behavior is shown in FIG. 11 are predominantly controlled by the stiffness and mass distribution while the damping controls the magnitude of the resonances. In the resonance region the frequency of an individual resonance is proportional to $\sqrt{B/\rho s}$. According to the present invention, the frequency and magnitude of these individual resonances are controlled by varying B and η which are in turn controlled by the electric field dependent complex moduli (G', G'', E', and E'') of the ER fluid contained in the composite panel.

The critical frequency $f_c$ of the panel whose behavior is shown in FIG. 11 is that frequency for which the wavelength of a bending wave $\lambda_b$ equals the wave length of an acoustic wave λ in the surrounding medium. This occurs when the propagation speed of the bending wave $C_b$ equals the speed of sound c in the surrounding medium. At the critical frequency an acoustic wave traveling with grazing incidence along a structure element such as any one of 10a-10d will synchronize with bending waves in the element or panel. When this occurs a very high degree of coupling between the surrounding medium and the element or panel is achieved and the acoustic wave is able to excite bending wave vibrations therein as though it were at resonance. Conversely, bending waves in the element 10a-10d itself radiate very strong acoustic waves into the medium when coincidence occurs. For all frequencies above the critical frequency coincidence also occurs. This is because for all higher frequencies the wavelength of the bending wave in the element or panel equals the wavelength of a non-grazing acoustic wave projected onto the element or panel λ/sin φ) where φ is the angle of incidence as measured from the normal. Note that the critical frequency simply corresponds to an incidence angle of 90°. The critical frequency is determined by the bending stiffness B and mass per unit area ρs of the panel, as shown previously in equation (1). According to the present invention the critical coincidence frequency of a composite element 10a-10d containing ER fluid 14 is controlled by varying B which is in turn controlled by the electric field dependent properties of the ER fluid.

The relationship between the overall bending stiffness B and damping loss factor η of a composite panel and the shear and tensile properties G', G'', E' and E'' of an ER fluid contained in the composite panels such as elements 10a-10d can be understood from existing theories of panels and beams which contain fixed property viscoelastic layers. If a layered structure, such as a laminated beam or plate is forced to bend, each component of the structure is generally forced into a combined state of extensional and shear deformation. With each type of deformation in each layer there is associated some storage of energy and with each energy storage there is associated some energy dissipation. If the structure is considered to act like an array of series and parallel springs, with each spring representing an energy storage mechanism, then a net deformation of the overall structure can be considered as a displacement of the array of springs. This overall displacement would cause each spring to deflect some amount, and corresponding to each spring deflection would be a theoretical amount of energy storage $W_i$ and a loss factor $\eta_i$. What this means is that spring i could theoretically store an amount of energy equal to $W_i$, but because of its loss factor $\eta_i$ the actual amount of energy stored by the spring would be equal to $W_i (1-\eta_i)$. The remaining available energy, equal to $\eta_i W_i$, would be dissipated. If the displacements are cyclic, then the loss factor of the entire array of springs is defined as $$\eta = \frac{\Sigma \eta_i W_i}{\Sigma W_i} \tag{5}$$

where the summations are taken over all of the springs, or recalling the analogy over all of the components of the composite structure.

In view of equation (5), it is seen that is a single component of a structure is to contribute significantly to the loss factor of the overall structure, then that component must inherently have a high loss factor and must be placed in a state of deformation which yields a large value of theoretical storage energy. These observations form the basis for the theory of structural damping using viscoelastic materials which can be expanded to controllable viscoelastic layers incorporating electrorheological fluids. Because viscoelastic materials are generally characterized by large loss factors relative to elastic materials, they are useful for the vibration control of otherwise elastic structures. It is important, however, to design the structures with the viscoelastic components in strategic configurations or locations such that the amount of energy stored by the viscoelastic materials is a large fraction of the total structural energy storage.

By controlling an electric potential applied across ER fluid layers 12 in one of two directions as shown in FIGS. 1-5, viscoelastic material layers or structure elements such as 10a-10d with different controllable effective properties can be produced. For example, in the configuration shown in FIG. 1 as element 10a, the positioning of the electrodes as layers 12 above and below the ER fluid layer produces an applied electric field through the thickness of the lamina. When the element 10a is forced into a flexural mode of deformation the ER fluid 14 is exposed to a state of shear, and the previously discussed controllability of the complex shear modulus of the ER fluid will dominate the overall effective shear modulus of the entire lamina. Thus the lamina shown in FIG. 1 can be thought of as a viscoelastic layer with controllable complex shear modulus. Alternatively, viscoelastic layers with controllable effective extensional modulus can be constructed as shown in FIGS. 4-5. In this configuration, the positioning of the electrodes or layers 12 as shown produces an applied electric field in the axial direction. When the lamina or element 10d is put into flexure, the ER fluid particle chains are forced into a state of axial tension, and it is the controllability of the tensile modulus, also previously discussed, which dominates the flexural behavior of the entire lamina. Thus, elements such as 10d can be thought of as overall viscoelastic layers with controllable extensional or elongational modulus.

The proposed configurations of ER fluid filled viscoelastic laminae with controllable effective complex shear and tensile moduli respectively, shown as elements 10a–10d herein may be used in laminated composite structures to obtain overall structural behavior control. Viscoelastic laminae with controllable shear moduli can be used in a manner similar to present day constrained layer damping treatments, and likewise the controllable extensional modulus layers such as elements 10a–10d can be applied commercially in the fields of laminated composites and unconstrained viscoelastic layer damping.

Figure 12A:
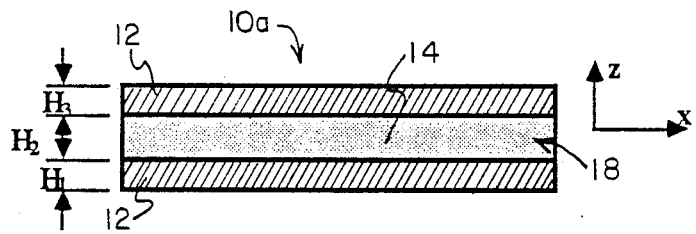
FIG. 12A is a schematic, cross-sectional view in full elevation of an electrorheological fluid structure element of thickness of $H_2$ constrained by elastic material layers of thicknesses $H_1$ and $H_3$.
Figure 12B:
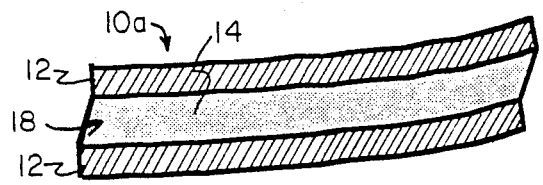
FIG. 12B is a schematic, cross-sectional view in full elevation of the electrorheological fluid structure element and constraining layers of FIG. 12A under deformation.

Referring to FIGS. 12(a) and 12(b), there is depicted a schematic illustration of element 10a representing a typical section of a panel with a constrained electrorheological fluid viscoelastic layer 14. A theory which is useful in relating the material properties and geometrical arrangement of panels or elements 10a made up of viscoelastic layers 14 and elastic layers 12 to overall flexural behavior of the composite structure is the Ross-Kerwin-Unger model. In its most basic form for the design of structures, the Ross-Kerwin-Unger model assumes simply supported end conditions and may be applied as follows. The sample shear damping configuration of element 10a depicted in FIG. 12(a) is shown in the undeformed state. In such configurations, the electrorheological fluid 14 is sandwiched between the two elastic material or constraining containment layers 12. Flexural deformation of the structure produces not only bending and extension but also shear, which occurs primarily in region 18 acting on ER fluid 14 as shown in FIG. 12(b). The strain energy associated with this shear tends to dominate the damping behavior of the overall structure.

Assuming that the extensional stiffness of region 18 is small compared to that of the elastic materials, the loss factor of the entire structure is $$\eta = \frac{\eta_2 Y X}{1 + (2 + Y)X + (1 + Y)(1 + \eta_2^2) X^2} \quad (6)$$

In equation (6), $\eta_2$ is the loss factor in shear of region 18, ($\eta_2 = G''/G'$), Y is a stiffness parameter, and X is a shear parameter. In its full form, the stiffness parameter, Y, is defined as $$Y = \left[ \frac{E_1 H_1^3 + E_3 H_3^3}{12 \, H_{31}^2} \left( \frac{1}{E_1 H_1} + \frac{1}{E_3 H_3} \right) \right]^{-1} \quad (7)$$

where $E_i$ and $H_i$ are the tensile modulus and thickness of the ith layer respectively and $H_{31}$ is the distance between the mid-planes of the elastic constraining containment layers 12, ($H_{31} = H_2 + (H_1 + H_3)/2$). For the present discussion, the elastic layers 12 will be considered to be made of the same material and to have equal thicknesses, thus $E_1 = E_3$ and $H_1 = H_3$. With these assumptions, the stiffness parameter becomes simply a geometric parameter, which is $$Y = 3 \left( \frac{H_{31}}{H_1} \right)^2 . \quad (8)$$

Under these same assumptions, the shear parameter, X, is defined as $$X = \frac{2 \, G_2}{p^2 H_1 H_2 E_1} \quad (9)$$

where p is the wave number, which is related to the wavelength of flexural vibration of the element 10a by the relation $p = 2\pi/\lambda$. Thus, by choosing an ER fluid 14 with a selectable and determinable complex shear modulus and designing a layer of this material such as region 14 into an otherwise elastic composite panel, one can select the effective loss factor, and thereby the damping, of the overall structure.

In addition to dominating structural damping, the existence of a constrained ER fluid material 14 in a layer or region 18 of a composite panel 10a as shown in FIG. 12(a) also modifies the flexural rigidity of the structure. For the configuration shown, the effective complex flexural rigidity or bending stiffness of the element 10a is:

$$\bar{B} = (B_1 + B_3)\left( 1 + \frac{\bar{X} Y}{1 + \bar{X}} \right) \quad (10)$$

where $$B_i = \frac{E_i H_i^3}{12} \quad (11)$$

and $$\bar{X} = X(1 + i\pi_2) \quad (12)$$

This change in effective stiffness of element 10a due to the region 18 having ER fluid 14 brings about a corresponding change in the resultant frequency of flexural vibration, $\omega$. For simple beam panels, this is evident through the relation $$\omega = p^2 \sqrt{\frac{B}{\rho_s}} \quad (13)$$

in which $\rho_s$ is as defined previously the mass per unit area of the panel. Thus, like the loss factor, the frequency of vibration of composite panel structures such as element 10a encompassing a region 18 having ER fluid 14 changes with corresponding changes in the complex shear modulus of the ER fluid.

Based on the discussion above, it is evident that the use of ER fluids which have controllable complex shear moduli enables the design of composite panels to produce structures with a wide range of controllable mechanical behavior. Thus ER fluid composite structures such as that contemplated by the present invention are especially useful in the structural vibration control industry to produce structures of greatly enhanced controllable mechanical behavior.

Figure 13:
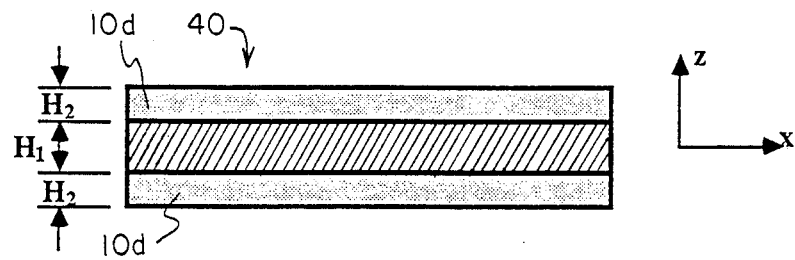
FIG. 13 is a schematic, cross-sectional view in full elevation of an elastic material layer of thickness $H_1$ constrained by electrorheological fluid structure elements of thickness $H_3$.

Referring now to the control of laminated structure behavior using viscoelastic laminae with controllable effective extensional moduli (FIGS. 5 and 7), a similar mathematical treatment can be applied to predict loss factor and damping characteristics. Additionally, more complex structures are contemplated as well, such as the laminate 40 shown in FIG. 13. Laminate 40 can be constructed utilizing a suitably rigid yet elastic material layer 42 and two layers formed of ER fluid structure elements such as 10d. A possible application envisioned for laminate 40 may be an articulating robot arm such as that shown in FIG. 20. Referring in detail to FIG. 13, the elastic material layer 42 of thickness $H_1$ is simply sandwiched between two similar controllable extensional modulus viscoelastic layers 10d of thickness $H_2$. Other creative and complex laminate stacking sequences such as non-symmetric laminates including off-axis plies could be designed to meet custom controllability needs. For the simple laminated structure 40 shown in FIG. 13 assuming both small flexural deformations and that $E_2'H_2 < < E_1'H_1$, the effective structural loss factor $\eta$ and complex flexural rigidity $\bar{B}$ can be derived as $$\eta = \frac{2\eta_{2e}}{1 + \frac{E_1}{E_2}\left(\frac{H_1^3/H_2}{H_2^2 + 12 H_{12}^2}\right)} \quad (14)$$

and $$\bar{B} = \frac{1}{3}\left\{\left[\frac{E_1}{(1 - \nu_{xy}\nu_{yx})_1}\right]\frac{H_1^3}{4} + \left[\frac{E_2(1 + i\eta_{2e})}{(1 - \nu_{xy}\nu_{yx})_2}\right]\left[\frac{3}{2}H_1^2H_2 + 3H_1H_2^2 + 2H_2^3\right]\right\} \quad (15)$$

In equations (14) and (15), $E_1$ is the extensional modulus of the elastic layer, $E_2'$ and $E_2''$ are the real and imaginary parts of the effective extensional modulus of the viscoelastic element 10d, $\eta_{2e}$ is the effective loss factor of the viscoelastic element 10d in extension ($\eta_{2e}=E_2''/E_2'$), and $\nu_{xy}$ and $\nu_{yx}$ represent the principle direction Poisson's ratios of the two materials in the x-y plane. $H_{12}$ is the distance between neutral axes of adjacent layers ($H_{12}=(H_1+H_2)/2$). From equations (14) and (15), it is evident that by controlling the effective complex tensile modulus of the viscoelastic layers, control of the overall loss factor and complex flexural rigidity of the entire laminated structure 40 can be achieved.

Figure 14:
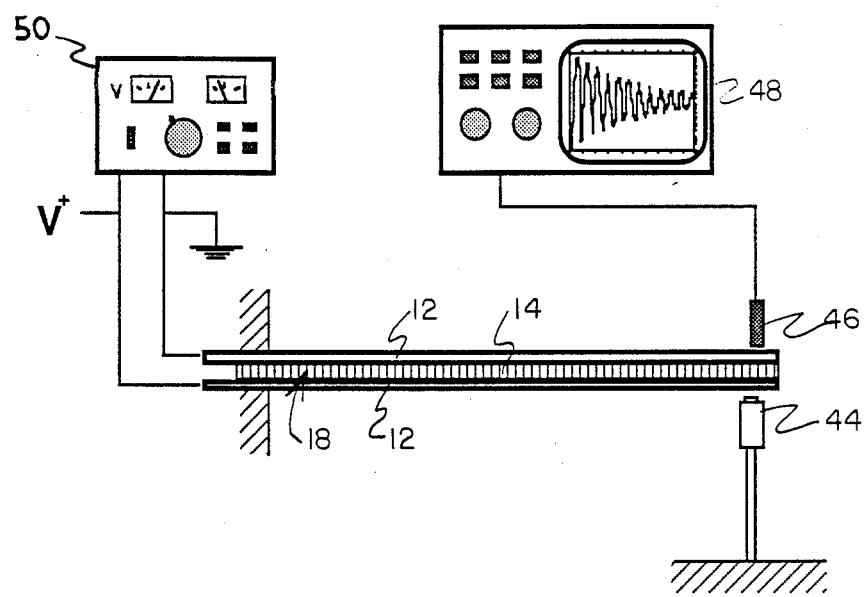
FIG. 14 is a schematic representation of the experimental apparatus used in obtaining the data provided in FIG. 15 and Table 1.

To illustrate the performance characteristics of ER fluid composite structure systems of the present invention, tests were performed on composite beam specimens of the type shown in FIG. 1. As shown in FIG. 14, the test beam geometry selected was symmetric with an ER fluid 14 sandwiched between two identically sized elastic face plates or layers 12. The ER fluid filled cavity or region 18 between the containment layers 12 was sealed with a silicone RTV sealant, which also served as an electrical insulating layer such as 20 in FIG. 1 separating the two plates. Following specimen fabrication, each beam or element 10 was clamped in a horizontal cantilevered type of configuration as illustrated in FIG. 14. A displacement triggering mechanism 44 was utilized to create repeatable free vibration of the element 10a. Upon the static deflection and release of the free edge using the triggering mechanism 44, lateral vibration resulted which decayed in magnitude with time. This vibration was monitored using a noncontacting proximity probe 46 and a signal analyzer 48 to record the temporal deflection of the free edge of the beam or element 10a. The concept of controllable structural behavior was studied by electrically grounding one containment layer 12 and varying the DC voltage applied to the other layer 12 from test to test using a high voltage DC power supply 50.

Figure 15:
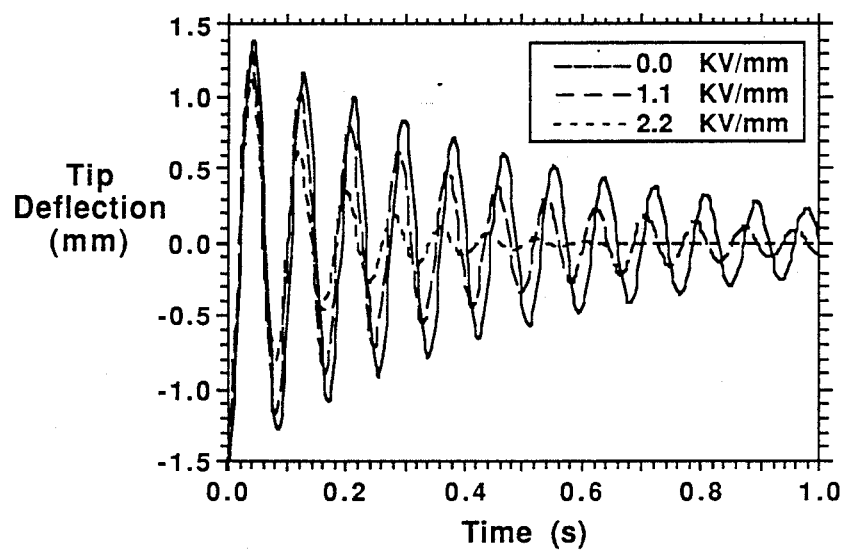
FIG. 15 is a graphical plot of beam tip deflection showing the amplitude of displacement in millimeters versus time in seconds for various parameters of control voltage applied to the beam.

Sample results for the case of an element 10a with aluminum face plates as layers 12 sandwiching the electrorheological material 14 are presented in FIG. 15 and Table 1. For the case presented, the DC voltage applied to the non-grounded face layer 12 ranged from 0 to 4 Kilovolts (KV), which exposed the ER fluid 14 to electric fields ranging from 0 to 2.2 KV/mm. The beam element 10a exhibited an inherent frequency of vibration and loss factor prior to application of an electric field. These values were determined from the experimental data using the fundamental relations $$\omega = \frac{2\pi}{T} \quad (16)$$

and $$\eta = \frac{1}{N\pi}\ln\left(\frac{y(t_o)}{y(t_N)}\right) \quad (17)$$

where T is the period of cyclic oscillation, y ($t_o$) is the displacement of a point on the element 10a at time t=0 and y (tN) is the displacement of that same point after N full cycles of oscillation. As shown in Table 1, the zero field values for these variables were $\omega=73.87$ rad/s and $\eta=0.050$. As anticipated, these values both became larger when an electric field was applied to the ER fluid 14 within the element 10a. This can clearly be seen in FIG. 15 and is quantified in Table 1. For field values of 1.1 and 2.2 KV/mm, the frequency of flexural vibration increased by 1.8% and 5.9% of the zero field value respectively. The corresponding increases in loss factor for these cases were a dramatic 54% and 244%. Thus it was shown that controllable response of composite structures was achievable by using ER fluids as integrated structural components. Predictable quantitative correlation between performance and expected results using the RKU theory assumes a two-dimensional system analysis.

Figure 16:
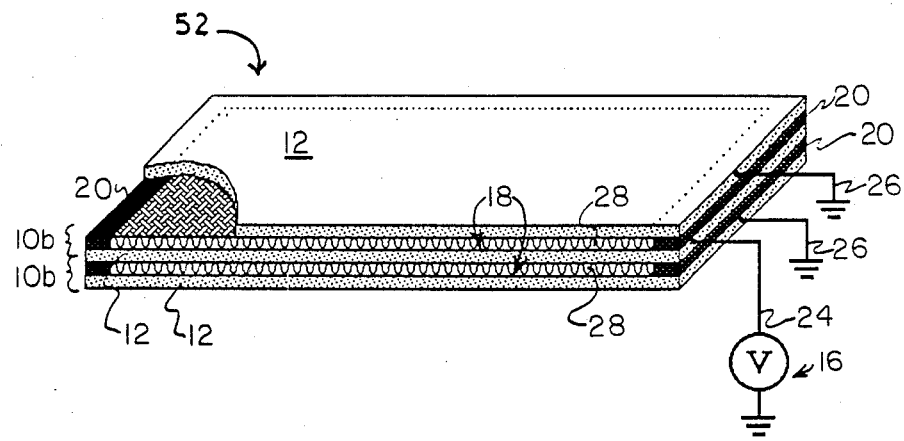
FIG. 16 is a partially broken away, schematic representation of an alternative embodiment of the electrorheological fluid structure element of the present invention similar to that shown in FIG. 2 configured in multiple overlying layers.
Figure 17:
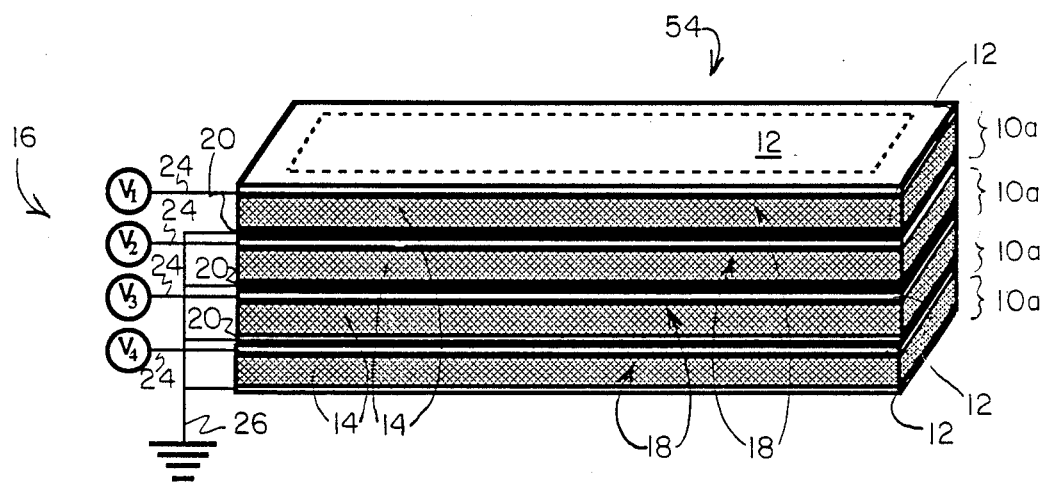
FIG. 17 is a schematic representation in perspective of an electrorheological fluid structure element similar to that of FIG. 1 configured in multiple overlying layers.
Figure 18:
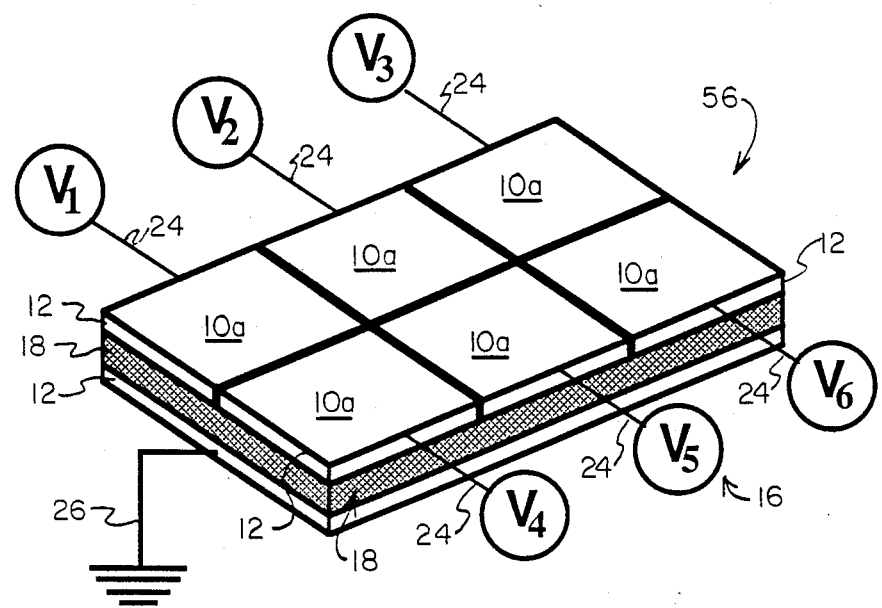
FIG. 18 is a schematic representation in perspective of multiple electrorheological fluid structure elements of the present invention contiguously interconnected.

Referring now to FIGS. 16-18, it is readily apparent that the ER fluid composite structure elements 10a-10d of the present invention are versatile in their geometric configuration or arrangement relative one to another. For example, multiple containment layers 12 having fluid containment regions 18 therebetween may be stacked to form a single structure or laminate. The voltage applied to each lamina or region 18 containing ER fluid 14 may be controlled individually or in combination. The number, thickness and other dimensions of the laminate may be varied according to the particular application. FIG. 16 shows a laminate 52 comprising multiple ER fluid structure elements 10a in overlying relationship. Similarly, FIG. 17 shows a laminate 54 having in multiple overlying relationship multiple structure elements 10b. Any of the arrangements shown equally may incorporate the alternative ER fluid structure elements of 10c and 10d, as well as combinations thereof. Referring specifically to FIG. 18, individually controllable sheets or structure elements 10a-10d may also be integrated horizontally or contiguously. The elements 10a-10d or laminae formed therefrom, can be formed into a contiguous panel 56 to provide for separately controllable zones thereof. These structures may be configured in combination with other structural elements according to the desired function.

The ER fluid composite structures of the present invention can also exhibit controllable static properties. If structural elements 10a-10d are first deformed and then an electric potential is applied, all or part of that deformation may be retained when the structure is released. The structural element will therefore not necessarily return to its original shape, but maintain a stressed state. When the voltage is decreased, the element may return to its original configuration. A variety of applications may be contemplated taking advantage of this phenomenon, including that depicted in FIG. 19. The deformable gripper 58 which is shown includes an electrorheological fluid structure element 10b which forms a flexible bag 60. Flexible bag 60 is secured in a suitable manner to a base 62. The interior portion 64 between base 62 and bag 60 may be filled with gas, liquid, or other fluid media. A controllable voltage is applied to the element 10b to determine the mechanical characteristics of bag 60. In the undeformed state, bag 60 may be placed in contact with an object. In this manner, bag 60 can envelope the object without damage thereto. Upon application of the applied electric field to element 10b, bag 60 becomes rigid and capable of retaining or lifting the object as desired. Bag 60 becomes flexible upon decreases in the applied field thereto for release of the object. Gripper 58 may also be configured with any variety of flexible protrusions depending upon the desired function for gripping or immobilizing objects. The concept also contemplates use of any one of elements 10a-10d, as desired. Further, the concepts discussed may be equally well employed for molding and other industrial processes.

Figure 20:
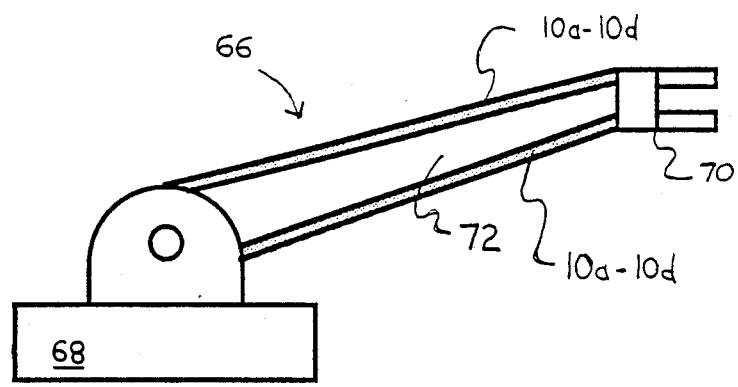
FIG. 20 is a schematic representation shown in side elevation of a robot arm articulating member incorporating as a portion thereof electrorheological fluid structure elements of the present invention.

The ER fluid composite structures of the present invention can be easily configured and applied to numerous commercial applications, including that shown in FIG. 20 for an articulating robotic system 66. The performance of robots such as system 66 and others is quantified by the speed of operation, trajectory following, end-point accuracy and settling time in performance of various tasks. Performance clearly depends upon the mass, stiffness and damping characteristics of the articulating members. System 66 for purposes of illustration is shown having a base 68 and end effector 70. System 66 also includes an articulating arm 72 that may incorporate any one or more of ER fluid composite elements 10a-10d as a portion of the structure or the structure itself. From the foregoing, it is apparent that multiple elements 10a-10d can be controlled separately by variable input of voltage to electrodes attached to the containment elements 12. This representative construction can be used to control unwanted resonances or flexibility in a robot manipulator and can also be employed for other uses which will be apparent to those skilled in the art.

Figure 21:
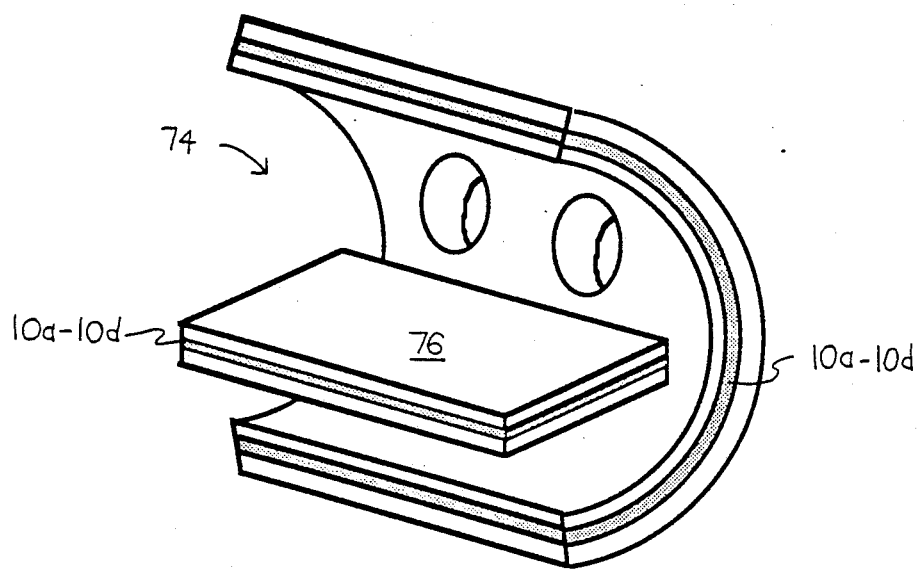
FIG. 21 is a broken away, schematic representation in perspective of an airplane fuselage incorporating as a portion thereof electrorheological fluid structure elements of the present invention.

Referring now to FIG. 21, any one or more of ER fluid composite structure elements 10a-10d can be configured as a component of an airplane fuselage 74. The elements 10a-10d can, for example, surround the passenger cabin and floor 76 and tune the structure away from the major forcing frequencies. Changes in the stiffness of the layers can alter the frequencies of vibration experienced by the structure to eliminate unwanted noise or vibration. Other aerospace and industrial applications for vehicles, buildings and the like are contemplated.

Figure 22:
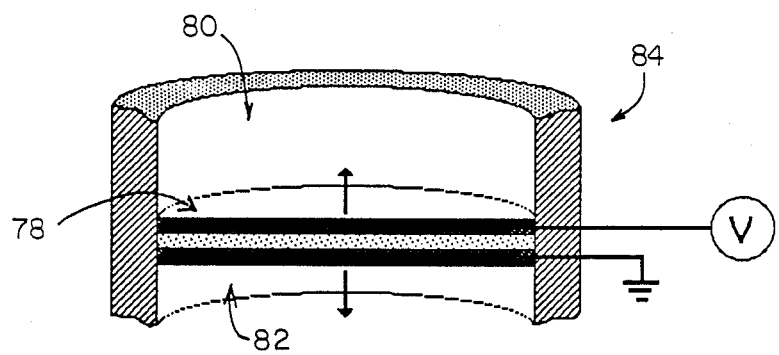
FIG. 22 is a broken away, partially cross-sectional schematic representation of a damping means utilizing an electrorheological fluid structure element of the present invention as a diaphragm between opposing working chambers.

Elements 10a-10d may also function as a barrier or diaphragm for acoustical control. Applications include that depicted in FIG. 22 as a diaphragm 78 between working chambers 80 and 82 of a fluid damper 84. Resonant frequencies may be controlled as, for example, in a secondary resonator element of a fluid inertia damper.

In view of the foregoing, it should be apparent that the ER fluid composite structure elements of the present invention, the various embodiments thereof and variety of applications to which they can be applied provide for improved control of structures and vibration. Commercial application of structures employing the concepts of the present invention is encouraged by their durability and ready manufacturability.

While preferred embodiments of the present invention have been described in detail, they are used in a generic and descriptive sense only and not for purposes of limitation; various modifications, alterations and changes may be made without departing from the spirit and scope of the present invention as defined in the appended claims.

TABLE 1

|  | APPLIED ELECTRIC FIELD (KV/mm) | | |
| --- | --- | --- | --- |
|  | 0.0 | 1.1 | 2.2 |
| $\omega$ (rad/s) | 73.87 | 75.23 | 78.24 |
| $\eta$ | 0.050 | 0.077 | 0.172 |

What is claimed is:

1. A flexible, laminar beam or panel for carrying lateral loads and bending movements comprising at least two flexible, electrically conductive containment layers configured in a parallel, spaced relationship and defining therebetween an enclosed space, an electrorheological fluid confined within said space, and an electric field generating means connected to each of said layers for applying a voltage potential between said layers thereby producing an electric field across said fluid, wherein the magnitude of said voltage potential is selected for determining the complex moduli of said fluid and the complex stiffness characteristics of said beam or panel.

2. The beam or panel according to claim 1 wherein a plurality of said containment layers are configured in series normal to the plane of said beam or panel.

3. The beam or panel according to claim 1 wherein a plurality of said containment layers are configured in an overlying relation to provide for separately controllable lamina of said beam or panel.

4. The beam or panel according to claim 1 wherein a plurality of said containment layers are configured in a contiguous relation to provide for separately controllable areas of said beam or panel.

5. The beam or panel according to claim 1 further comprising a porous layer disposed within said enclosed space for preventing contact of said electrically conductive layers with each other.

6. The beam or panel according to claim 5 wherein said beam or panel comprises a portion of a flexible gripping element.

7. The beam or panel according to claim 1 wherein said electric field generating means comprises a piezoelectric polymer layer electrically connected to said containment layers.

8. The beam or panel according to claim 1 wherein said beam or panel comprises a portion of an articulating robot arm.

9. The beam or panel according to claim 1 wherein said beam or panel comprises a portion of an aircraft fuselage.

10. The beam or panel according to claim 1 wherein said beam or panel comprises a portion of an aircraft wing.

11. A method for controlling the vibration characteristics of a laminar beam comprising the steps of providing at least two spaced, parallel flexible containment layers of conductive material for forming the upper and lower surfaces of said beam, enclosing an electrorheological fluid within said space between said layers, applying a voltage potential between said layers for producing an electric field across said fluid to select the complex moduli thereof, and varying the magnitude of said voltage potential to vary the complex stiffness characteristics of said beam.

12. The method according to claim 11 further comprising the step of providing said containment layers in series and oriented normal to the plane of said beam or panel.

13. A method for controlling the mechanical behavioral characteristics of laminated composite structures, comprising the steps of providing elastic containment layers of selected tensile modulus, thickness and distance therebetween to form at least a portion of said composite structure, enclosing an electrorheological fluid in one or more regions between said containment layers, selecting the overall loss factor and flexural rigidity of said structure by adjusting the complex shear modulus of said electrorheological fluid responsive to a variable electric field applied across said one or more regions, wherein the overall loss factor is determined by the expression $$\eta = \frac{\eta_2 YX}{1 + (2 + Y)X + (1 + Y)(1 + \eta_2^2)X^2}$$

where $\eta_2$ is equal to the imaginary portion of the complex shear modulus of said fluid divided by the real portion thereof, Y is the stiffness parameter, and X is the shear parameter.

14. The method according to claim 13 wherein:
the shear parameter X is described by the expression $$X = \frac{2 G_2}{p^2 H_1 H_2 E_1}$$

where $G_2'$ is the real part of the complex shear modulus of the ER fluid filled regions; p is the wave number, $H_1$ is the thickness of one of said containment layers, and $H_2$ is the thickness of the other of said containment layers, and $E_1$ is the tensile modulus of said containment layers.

15. The method according to claim 13 wherein:
the flexural rigidity $\bar{B}$ of the composite structure is determined by the expression $$\bar{B} = (B_1 + B_3)\left(1 + \frac{XY}{1 + X}\right)$$

where $B_1$ and $B_3$ are the flexural rigidities of the elastic layers alone, $\bar{X}$ is a complex shear parameter, and Y is a stiffness parameter.

16. A method for controlling the mechanical behavioral characteristics of laminated composite structures, comprising the steps of providing elastic containment layers of selected tensile modulus, thickness and distance therebetween to form at least a portion of the composite structure, enclosing an electrorheological fluid in one or more regions between said containment layers, and selecting the overall loss factor and flexural rigidity of the composite structure by adjustment of the complex elongational modulus of said electrorheological fluid responsive to a variable electric field applied across said one or more regions, wherein the overall loss factor $\eta$ of a simply supported laminated structure having said containment layers in series on either side of an elastic layer is determined by the expression $$\eta = \frac{2\eta_{2e}}{1 + \frac{E_1}{E_2}\left\{\frac{H_1^3/H_2}{H_2^2 + 12 H_{12}^2}\right\}}$$

where, $\eta_{2e}$ is equal to the imaginary component of the complex tensile modulus $E_2''$ divided by the real portion $E_2'$ thereof for said fluid, $E_1$ is the tensile modulus of the elastic material, $H_1$ is the thickness of the regions, and $H_{12}$ is the distance between the midplanes of adjacent layers.

17. The method according to claim 16 wherein:
the overall complex flexural rigidity $\bar{B}$ of a simply supported laminated structure having said containment layers in series on either side of an elastic layer can be determined by the expression $$\bar{B} = \frac{1}{3}\left\{\left[\frac{E_1}{(1 - v_{xy}v_{yx})_1}\right]\frac{H_1^3}{4} - \left[\frac{E_2(1 + i\eta_{2e})}{(1 - v_{xy}v_{yx})_2}\right]\left[\frac{3}{2} H_1^2 H_2 - 3 H_1 H_2^2 - 2 H_2^3\right]\right\}$$

where $E_1$ is the tensile modulus of the elastic layer, $E_2'$ is the real component of the complex tensile modulus of the ER fluid, $H_1$ is the thickness of the elastic material layer, $H_2$ is the thickness of the regions, and $n_{xy}$ and $n_{yx}$ are the two principle Poisson's ratios of the material layers in the x-y plane.

18. Apparatus for gripping objects comprising a base, at least two flexible, electrically conductive containment layers configured in a parallel, spaced relationship, and defining therebetween an enclosed space, wherein said layers are attached at a portion of the periphery thereof to said base, an electrorheological fluid confined within said space, and an electric field generating means connected to each of said layers for selectively immobilizing said fluid and said layers in a fixed position about said object.

* * * * *

UNITED STATES PATENT AND TRADEMARK OFFICE
CERTIFICATE OF CORRECTION

PATENT NO. : 4,923,057

DATED : May 8, 1990

INVENTOR(S) : Carlson et al.

It is certified that error appears in the above-identified patent and that said Letters Patent is hereby corrected as shown below:

IN THE SPECIFICATION

Col. 1, line 15, change "changes" to --changed--.

Col. 1, lines 66-68, change "structures in the manner contemplat Spatially discrete damping treatments are" to --structures in the manner contemplated herein. Spatially discrete damping treatments are only capable of controlling a limited--.

Col. 2, line 64, change "manner they are" to --manner, are--.

Col. 2, line 68, change "of a viscoelastic material to the surface of" to --application of a viscoelastic material to the surface of--.

Col. 3, line 40, change "include" to --includes--.

Col. 4, line 67, change "tensile of" to --tensile and--.

Col. 5, line 33, change "expanded." to --expanded--.

Col. 6, line 14, change "stain" to --strain--.

Col. 6, line 26, change "low frequency" to --low-frequency--.

Col. 6, line 42-43, change "experimentalapparatus" to --experimental apparatus--.

Col. 8, line 30, change "contemplate" to --contemplates--.

Col. 9, line 38, change "$80_h$" to --$\lambda_b$--.

Col. 9, line 39, change "$\lambda_1$" to --$\lambda_b$--.

UNITED STATES PATENT AND TRADEMARK OFFICE
CERTIFICATE OF CORRECTION

PATENT NO. : 4,923,057

DATED : May 8, 1990

INVENTOR(S) : Carlson et al.

It is certified that error appears in the above-identified patent and that said Letters Patent is hereby corrected as shown below:

Col. 10, line 3, change "$\gamma$" to --$\dot{\gamma}$--.

Col. 10, line 18, change "$\dot{\gamma}$" to --$\gamma$--.

Col. 10, line 43, change "tensilemodulus" to --tensile modulus--.

Col. 12, line 20, change "that is" to --that if--.

Col. 13, line 53, italicize "ith".

Col. 14, line 32, equation (12), change "$\eta$" to --$\eta$--.

Col. 16, line 37, change "RKU" to --Ross-Kerwin-Unger--.

IN THE CLAIMS

Col. 19, line 60, change "XY" to --$\overline{XY}$--.

Col. 19, line 60, change "X" to --$\overline{X}$--.

Col. 20, line 46, change "tensilemodulus" to --tensile modulus--.

Signed and Sealed this

Twenty-sixth Day of November, 1991

*Attest:*

HARRY F. MANBECK, JR.

*Attesting Officer*   *Commissioner of Patents and Trademarks*